UNITED STATES PATENT OFFICE.

ALDUS F. HAWTHORN AND GEORGE W. HAWTHORN, OF LANCASTER, PA.

COMPOUND FOR PAINTING ROOFS, &c.

SPECIFICATION forming part of Letters Patent No. 241,803, dated May 24, 1881.

Application filed December 24, 1880. (No specimens.)

*To all whom it may concern:*

Be it known that we, A. F. HAWTHORN and GEO. W. HAWTHORN, citizens of the United States, residing at Lancaster, in the county of Lancaster and State of Pennsylvania, have invented a new and useful Compound for Painting Roofs, Fences, and all Metallic Surfaces, of which the following is a specification.

Our composition consists of the following ingredients, combined in the proportions stated, viz: one barrel coal-tar, forty-six gallons; three gallons asphaltum varnish; three gallons gutta-percha; one gallon Japan varnish; three gallons spirits of turpentine; four pounds Venetian red; four quarts pulverized pumice-stone; two pounds ground alum; two pounds dry sulphate of iron; five quarts air-slaked lime; five pounds burnt umber. Before mingling these ingredients the sulphate of iron and the lime are each mixed with benzine, and the gutta-percha is separately dissolved in benzine. The coal-tar constitutes the base of the compound, and in mixing the lime is first added, and afterward the other ingredients, each one separately.

The above-described compound is impervious to water, and in use presents a smooth, glossy surface. It does not possess an evaporative quality, and, being elastic, allows for the expansion and contraction caused by variations of temperature of the material on which it is used. It is unaffected by heat and cold, and neither cracks, blisters, nor breaks. Before being used the compound is thinned down to an appliable condition with either spirits of turpentine or benzine.

What we claim, and desire to secure by Letters Patent of the United States, is—

The herein-described composition of matter, to be used for painting roofs, fences, and all metallic surfaces, consisting of coal-tar, asphaltum varnish, gutta-percha, Japan varnish, spirits of turpentine, Venetian red, pulverized pumice-stone, ground alum, dry sulphate of iron, air-slaked lime, and burnt umber, in the proportions specified.

A. F. HAWTHORN.
GEO. W. HAWTHORN.

Witnesses:
GEO. A. LANE,
WM. R. GERHART.